United States Patent [19]

Nelson et al.

[11] Patent Number: 5,508,695

[45] Date of Patent: Apr. 16, 1996

[54] METHOD AND APPARATUS FOR IDENTIFYING MESSAGES ASSOCIATED WITH A SPORTS TEAM IN A COMMUNICATION SYSTEM

[75] Inventors: Leonard E. Nelson, Boynton Beach; Gerald R. King, Ft. Lauderdale; Thomas F. Holmes, Boynton Beach, all of Fla.

[73] Assignee: Motorola, Inc., Schaumburg, Ill.

[21] Appl. No.: 281,960

[22] Filed: Jul. 28, 1994

[51] Int. Cl.$^6$ ................................................ H04Q 1/00
[52] U.S. Cl. ................... 340/825.37; 340/825.44; 340/825.52; 340/323 R
[58] Field of Search .................... 340/825.37, 825.44, 340/323 R; 455/38.1; 375/57, 58, 67

[56] References Cited

U.S. PATENT DOCUMENTS

| | | |
|---|---|---|
| H1173 | 4/1893 | Davis et al. . |
| 4,758,834 | 7/1988 | Sato et al. . |
| 4,868,561 | 9/1989 | Davis et al. . |
| 4,922,221 | 5/1990 | Sato et al. . |
| 4,994,797 | 2/1991 | Breeden . |
| 5,043,721 | 8/1991 | May . |
| 5,122,778 | 6/1992 | Erhart et al. . |
| 5,187,735 | 2/1993 | Herrero-Garcia ................ 379/67 |

*Primary Examiner*—Brian Zimmerman
*Attorney, Agent, or Firm*—Kelly A. Gardner

[57] ABSTRACT

A communication system (100) for identifying messages concerning particular sports teams includes a terminal (105) for transmitting a message about a sports event as a radio frequency signal. A radio receiver (110) receives and decodes the radio frequency signal to recover therefrom the message. The radio receiver (110) also determines whether an identification code associated with the radio receiver (110) is included within a first location (205) of the message or a second location (210) of the message. When the identification code is included within the first location (205), a sports team associated with the radio receiver (110) is determined to be a home team in the sports event. When the identification code is included within the second location (210), the sports team associated with the radio receiver (110) is determined to be a visitor team in the sports event.

20 Claims, 7 Drawing Sheets

METHOD AND APPARATUS FOR IDENTIFYING MESSAGES ASSOCIATED WITH A SPORTS TEAM IN A COMMUNICATION SYSTEM

FIELD OF THE INVENTION

This invention relates in general to communication systems for transmitting messages, and more specifically to a communication system for transmitting information concerning sports events.

BACKGROUND OF THE INVENTION

Portable radio receivers, such as pagers, are typically carried by users for the purpose of receiving messages when away from a computer or telephone. Generally, a portable receiver includes an alert mechanism for generating an alert to announce reception of a message to the user. In response to receiving the message, the receiver may then display the message to the user automatically, or the message may be displayed in response to manipulation of controls by the user.

Recently, information service providers have implemented communication systems in which information relating to a particular topic is transmitted to a radio receiver when the user of that receiver has subscribed to the service. By way of example, a user can subscribe to a financial service which provides up-to-date information of financial interest. Additionally, a user can subscribe to a sports news service for providing information about sports events, such as baseball or football games. In the latter situation, however, the user must generally read each and every incoming message in order to determine whether a message is of interest to him. This can inconvenience the user under some circumstances, such as when the user is only interested in a particular event or a particular team.

Thus, what is needed is a method and apparatus for identifying to the user messages relating to a particular topic or event in which he is interested.

SUMMARY OF THE INVENTION

A radio receiver for receiving messages about sports events comprises a receiving circuit for receiving a radio frequency signal and recovering therefrom a message about a sports event and an identification locator element for determining whether an identification code is included within a first location of the message or a second location of the message. A controller coupled to the identification locator element determines that a sports team associated with the radio receiver is a home team in the sports event when the identification code is included in the first location and determines that the sports team is a visitor team in the sports event when the identification code is included in the second location.

A method, in a radio receiver, for identifying messages concerning particular sports teams comprises the steps of receiving and decoding a radio frequency signal to recover therefrom a message about a sports event and determining whether an identification code associated with the radio receiver is included within a first location of the message or a second location of the message. A sports team associated with the radio receiver is determined to be a home team in the sports event when the identification code is included within the first location, and the sports team associated with the radio receiver is determined to be a visitor team when the identification code is included within the second location.

A communication system for identifying messages concerning particular sports teams comprises a terminal for transmitting a message about a sports event as a radio frequency signal and a radio receiver for receiving and decoding the radio frequency signal to recover therefrom the message. The radio receiver also determines whether an identification code associated with the radio receiver is included within a first location of the message or a second location of the message. When the identification code is included within the first location, a sports team associated with the radio receiver is determined to be a home team in the sports event. When the identification code is included within the second location, the sports team associated with the radio receiver is determined to be a visitor team in the sports event.

DESCRIPTION OF A PREFERRED EMBODIMENT

Figure 1:
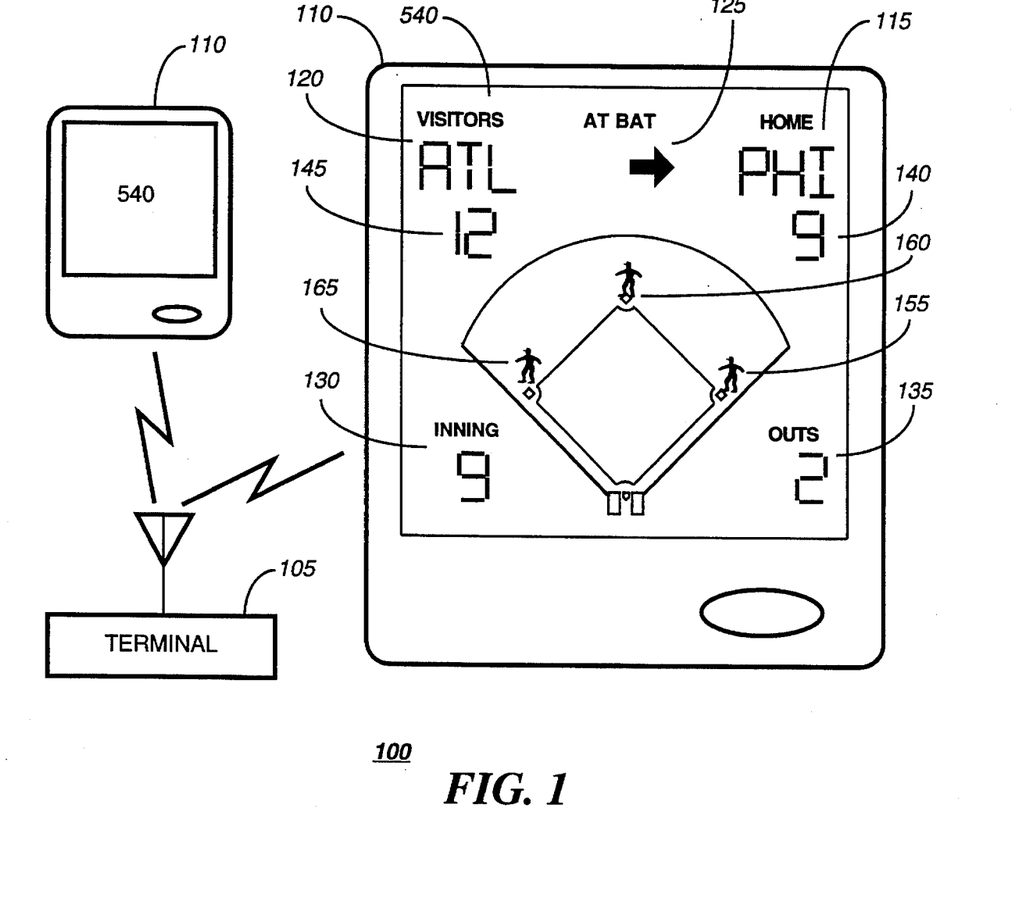
FIG. 1 is an electrical block diagram of a communication system in accordance with the present invention.

FIG. 1 is an electrical block diagram of a communication system 100 comprising a terminal 105 for transmitting messages to a plurality of radio receivers 110, such as portable pagers or transceivers, over the air. The messages received by the radio receivers 110 preferably include message information for display to the user in addition to alert codes from which a receiver 110 can determine which of several predetermined alerts should be generated to announce reception of the message.

According to the present invention, the radio receivers 110 receive common messages about sports events on the same paging address. By way of example, when the radio receivers 110 are to receive information about baseball or football, each radio receiver 110 is associated with a particular sports team by means of a stored recipient identification code (ID) indicative of that team. A radio receiver 110 preferably receives a sports message and scans the message to determine whether or not its "team ID" is included in that message to indicate that the message is of interest to the user. When the team ID associated with the radio receiver 110 is included in the message, the radio receiver 110 proceeds to locate an alert code included within the message to determine which of the predetermined alerts is to be generated. When, for instance, the message information indicates that the sports team associated with the receiver 110 has scored a run or a touchdown, an alert code within the message can prompt the receiver 110 to generate a "cheer" or "yea" sound to inform the user of a favorable occurrence. As mentioned, the same message is provided to all of the receivers 110. When the same message is received by a receiver 110 associated with the opposing team, a different alert code within the message can result in the generation of a "boo", "sigh", or other unfavorable sound by that receiver 110.

Furthermore, the information included in the message can be automatically displayed to the user when the team ID of the receiver 110 is included in the message. In this manner, the user is automatically informed by a visual display as well as an audible alert when a game update involving his team is received. The user can therefore immediately glance at the receiver display to receive current game information.

Messages that are not related to the user's team can be treated differently so that the user can distinguish messages about his team from messages about other teams. For instance, when the receiver 110 does not recognize its team ID within the message, the message can be stored and later displayed to the user so that the user can, at his leisure, peruse the different stored messages regarding other teams to review the status of all teams involved in a particular sports event. Preferably, messages which do not include the team ID associated with the receiver 110 are displayed in response to a manual display request initiated by the user.

The receiver 110 includes a display 540 which preferably displays the entire status of the game. It includes identifiers indicating the home and away teams 115 and 120 and which team is at bat 125. Also indicated is the inning number 130, the number of outs 135, and the home and visitor scores 140, 145. Furthermore, the display 540 includes the shape of a baseball diamond, as shown, with icons 155, 160, 165 for indicating the status of runners on first, second, and third bases. Thus, display 540 allows the user to observe the entire status of the game on a single screen.

Figure 2:
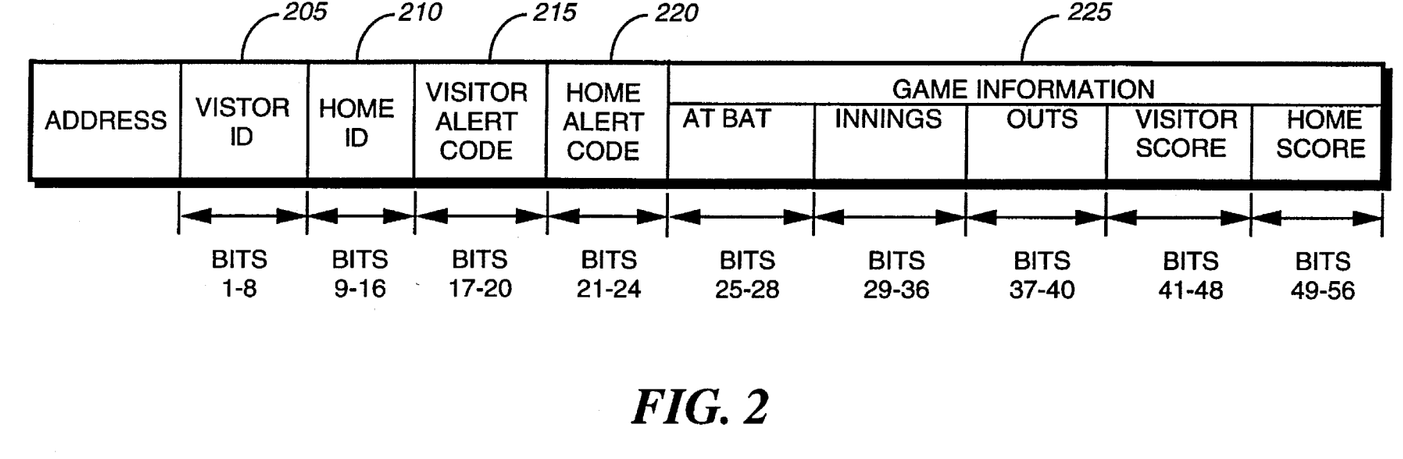
FIG. 2 is a signal diagram of a radio frequency signal including a message transmitted by a terminal included within the communication system of FIG. 1 to a radio receiver included within the communication system of FIG. 1 in accordance with the present invention.

FIG. 2 illustrates an example of a radio frequency (RF) signal including a message that can be transmitted from the terminal 105 to the receivers 110 to update users of the receivers 110 on a particular sports event, such as baseball. The RF signal includes a paging address which, as mentioned above, is a common address associated with each of the receivers 110 included in the communication system 100. Appended to the address is the message, which preferably comprises recipient, or team, IDs 205, 210 located in predetermined locations within the message to indicate which two baseball teams are currently playing a baseball game that is the subject of the message. The team IDs 205, 210 can, for example, each consume eight bits of the message. According to the present invention, the team IDs 205, 210 indicate by their locations which of the two teams is the home team and which of the two teams is the visitor team. In this example, the ID 205 for the visitor team is included first in the message, at bits one through eight, and is followed by the home team ID 210, at bits nine through sixteen. The message further comprises a visitor alert code 215 and a home alert code 220, each located in different predetermined locations. Additionally, the message can include game information 225 to inform the user of the current game status. Such game information 225 can, for example, include details about which team is at bat, the inning of the game, the number of outs for the team at bat, and the score of the game.

In accordance with the present invention, a radio receiver 110 associated with one of the team IDs 205, 210 can determine, from the location of its ID within the message, whether its team is the home team or the visitor team. Thereafter, the radio receiver 110 can advantageously determine the location of the appropriate alert code within the message such that an alert is generated to indicate whether the latest game event is favorable or unfavorable to the team associated with the receiver 110. Furthermore, the radio receiver 110 can easily determine, from the team IDs 205, 210 and their locations, whether the message is an update about a game in which a team favored by the user is playing. When, as indicated by one of the team IDs 205, 210, the message concerns a team of which the user is a fan, the message can be displayed automatically to present game information to the user immediately. When the receiver 110 does not recognize its team ID, the message can still be stored and presented to the user in response to a manual request such that the user can receive updates for other sports teams.

It will be appreciated that the message of FIG. 2 is depicted for example purposes only and that the placement of the team IDs 205, 210 and the alert codes 215, 220 can vary as long as the placement is predetermined and recognizable by the receiver 110. It will be further appreciated that the number of team IDs and alert codes can vary depending upon the sport with which the radio receiver 110 is associated. If, for example, information about a horse race is to be transmitted to the receivers 110, the number of team IDs and alert codes would be equal to the number of entries in the race.

Figure 3:
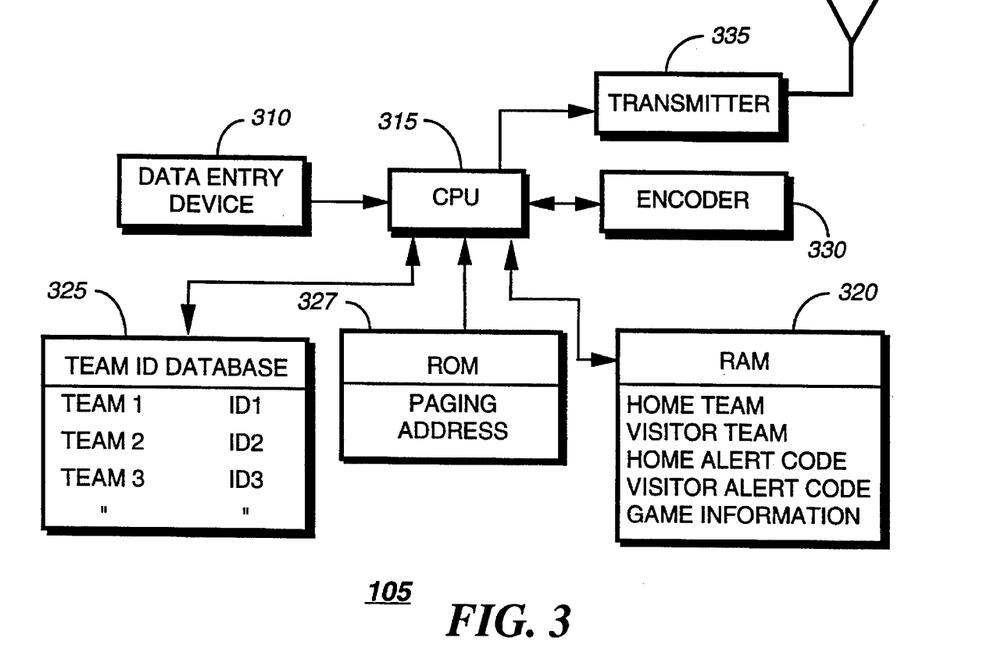
FIG. 3 is an electrical block diagram of the terminal included within the communication system of FIG. 1 in accordance with the present invention.

Referring next to FIG. 3, an electrical block diagram of the terminal 105 is depicted. The terminal 105 preferably comprises a data entry device 310, such as a keyboard, for entering the game information, the alert codes for the different teams, and information about which teams are involved in the sports event. Additionally, at the beginning of a sports event, the data entry device 310 can be utilized to enter information indicative of which team is the home team and which team is the visitor team. The information provided by the data entry device 310 is received by a central processing unit (CPU) 315 coupled thereto for controlling the operation of the terminal 105. The CPU 315 stores the information provided by the data entry device 310 in a memory, such as a random access memory (RAM) 320. The terminal 105 further comprises a database 325 for storing a list of all of the teams and the team IDs associated therewith. The team ID can be, if sufficient space is available within the message, the name of the team. Alternatively, the team ID could be an abbreviated form of the team name or any other information by which the team can be identified. A read only memory (ROM) 327 stores the paging address shared by the receivers 110 included in the communication system 100. It will be appreciated, however, that all information to be included in a message could be received via the data entry device 310 and forwarded to the encoder 330 and transmitter 335 for subsequent transmission to the receivers 110 without requiring the terminal 105 to format and place all of the message information.

The terminal 105 also includes an encoder 330 coupled to the CPU 315 for encoding the address, the team IDs, the alert codes, and the game information into a message in a conventional manner. By way of example, the message could be encoded using the POCSAG (Post Office Code Standardization Advisory Group) signalling format or the GSC (Golay Sequential Code) signalling format. The encoded message is provided to a transmitter 335 for transmitting the message as a radio frequency signal.

Figure 4:
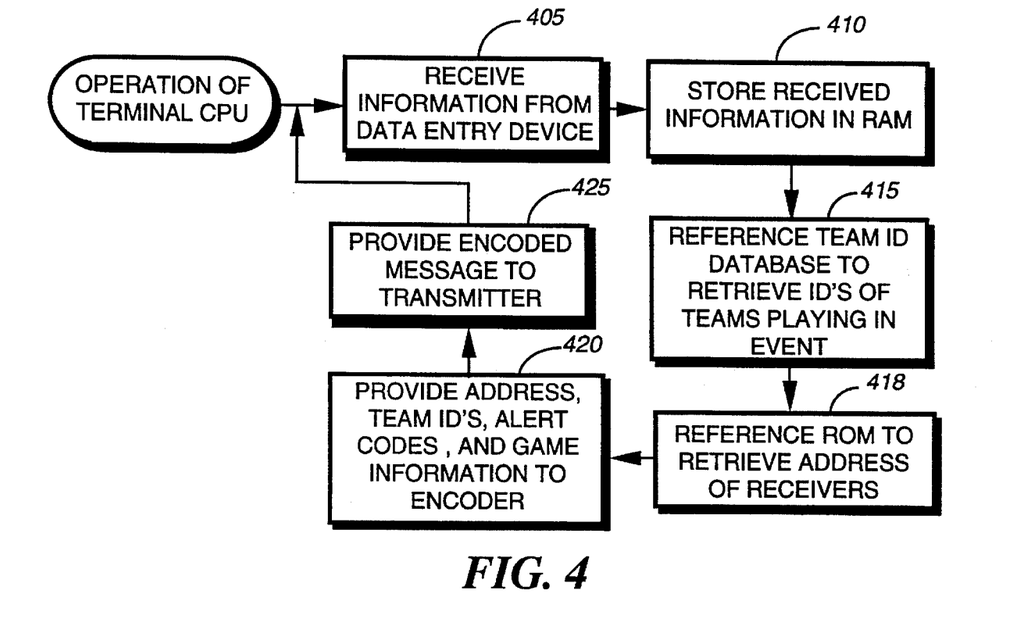
FIG. 4 is a flowchart of the operation of a processing unit included within the terminal of FIG. 3 in accordance with the present invention.

FIG. 4 is a flowchart illustrating the operation of the terminal CPU 315 in accordance with the present invention. Preferably, the CPU 315 receives, at step 405, the information, e.g., the game information, alert codes, and visitor and home team information, from the data entry device 310 and stores, at step 410, the information in the RAM 320. Thereafter, the CPU 315 references, at step 415, the team ID database 325 to determine the team IDs for the visitor and home teams involved in the current event. The CPU 315 further references, at step 418, the ROM 327 to retrieve the paging address of the receivers 110. The address, team IDs, alert codes, and game information are then, at step 420, provided to the encoder 330 for encoding into a message having the appropriate signalling format. According to the present invention, the message includes the team IDs and alert codes in the appropriate predetermined locations. By way of example, the CPU 315 can provide the visitor team ID to the encoder 330 as the first eight bits of the message when the first eight bits of the message are the predetermined location for the visitor team ID. When bits nine through sixteen are the predetermined location for the home team ID, the CPU 315 can provide the home team ID to the encoder 330 as the next eight bits of the message. This procedure is preferably also followed for placement of the visitor and home team alert codes in predetermined locations of the message. After the message is encoded, it is provided, at step 425, to the transmitter 335 for transmission to the receivers 110.

As described above, the alert codes are entered into the terminal 105 via the data entry device 310. It will be appreciated, however, that other methods for determining the alert codes to be sent to the home and visitor team receivers 110 could be utilized as well. For instance, the data entry device 310 could simply be used for entering the game information and information by which the teams are identified. A subroutine within the terminal 105 could be followed to determine how the current game information differs from previous game information and then whether the latest event in the game is favorable or unfavorable for each of the teams. If, for example, the current game information indicates that the home team has scored a run since reception of the previous game information, the terminal 105 could reference a database (not shown) to determine which alert code should be provided in that instance for the home team and which alert code should be provided for the visitor team. In this alternate embodiment of the present invention, the alert codes and the home and visitor IDs still require placement in predetermined locations within the message.

Figure 5:
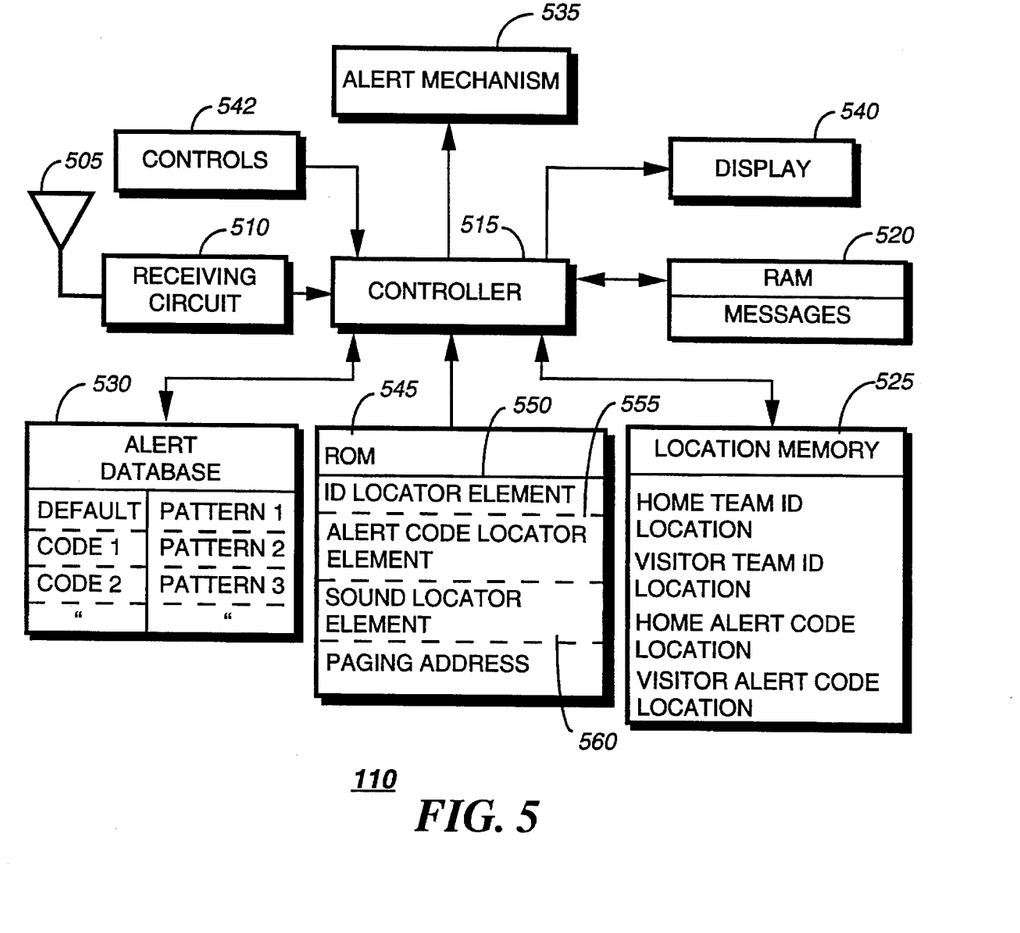
FIG. 5 is an electrical block diagram of the radio receiver included within the communication system of FIG. 1 in accordance with the present invention.

Referring next to FIG. 5, an electrical block diagram of the radio receiver 110 is shown. The radio receiver 110 preferably includes an antenna 505 for receiving an RF signal transmitted by the terminal 105 (FIG. 1). A receiving circuit 510 coupled to the antenna 505 decodes the RF signal to recover the message and address included therein in a manner well known to one of ordinary skill in the art and provides the message to a controller 515, which controls the operation of the radio receiver 110. The radio receiver 110 further comprises a memory, such as a RAM 520, for storing the message and a location memory 525 for storing parameters including the predetermined locations within each message for the visitor team ID, home team ID, visitor alert code, and home alert code. An alert database 530 preferably stores a listing of alert codes that can be received in the messages transmitted by the terminal 105 and a listing of alert information corresponding thereto. The alert database 530 additionally can store default alert information, e.g., an alert pattern, for alerting a user to the reception of a message that does not include a team ID associated with the receiver 110.

The radio receiver 110 further comprises an alert mechanism 535 for generating an alert based upon the alert information stored in the alert database 530 and a display 540 for displaying the game information included in the message to the user. Controls 542 coupled to the controller 515 provide user inputs to the controller 515. A memory, such as a read only memory (ROM) 545, stores firmware elements used in processing a received message. According to the present invention, such firmware elements include an ID locator element 550 for monitoring the message to find a team ID associated with the receiver 110 and determining the location thereof within the message. An alert code locator element 555 utilizes the team ID location to locate the appropriate alert code in the message, and a sound locator element 560 looks up the alert code in the alert database 530 to find alert information used in generating an alert to be heard by the user. The ROM 545 further stores the paging address associated with the receiver 110.

The alert information can be, for example, an alert pattern used to drive the alert mechanism 535 when the alert mechanism 535 comprises a transducer. Alternatively, the alert information can comprise a recorded sound to be played by a speaker. In embodiments that include recorded sounds, it is envisioned that such sounds could be customized by the user to provide for greater personalization of alerts.

The controller 515, RAM 520, alert database 530, location memory 525, and ROM 545 can be, by way of example, implemented using a microcomputer, such as the MC68HC05, C08, or C11 series manufactured by Motorola, Inc. Alternatively, the above-listed devices can be implemented through use of hardwired elements capable of performing equivalent operations. The antenna 505, receiving circuit 510, alert mechanism 535, display 540, and controls 542 can be implemented using conventional devices.

According to the present invention, the radio receiver 110 can advantageously determine from a common message whether a team of which the user is a fan is the subject of the message. Additionally, the receiver 110 can determine whether the team associated with the receiver 110 is the home team or the visitor team in order to perform further message processing. For example, the receiver 110 preferably generates an alert based upon whether the receiver 110 is associated with the home team or the visitor team. The receiver 110 also can process the message differently for display purposes depending upon whether the team associated with the receiver 110 is the subject of the message. When, for instance, the receiver 110 is associated with the home or visitor team, the game information of the message can be displayed automatically to the user. When the receiver 110 is not associated with the home or visitor team, indicating that the user is not particularly interested in that game information, the game information can be simply announced and stored for subsequent display. As a result, the user can be conveniently presented immediately with information in which he is especially interested, while waiting until a later time to scroll through messages relating to different teams.

Figure 6:
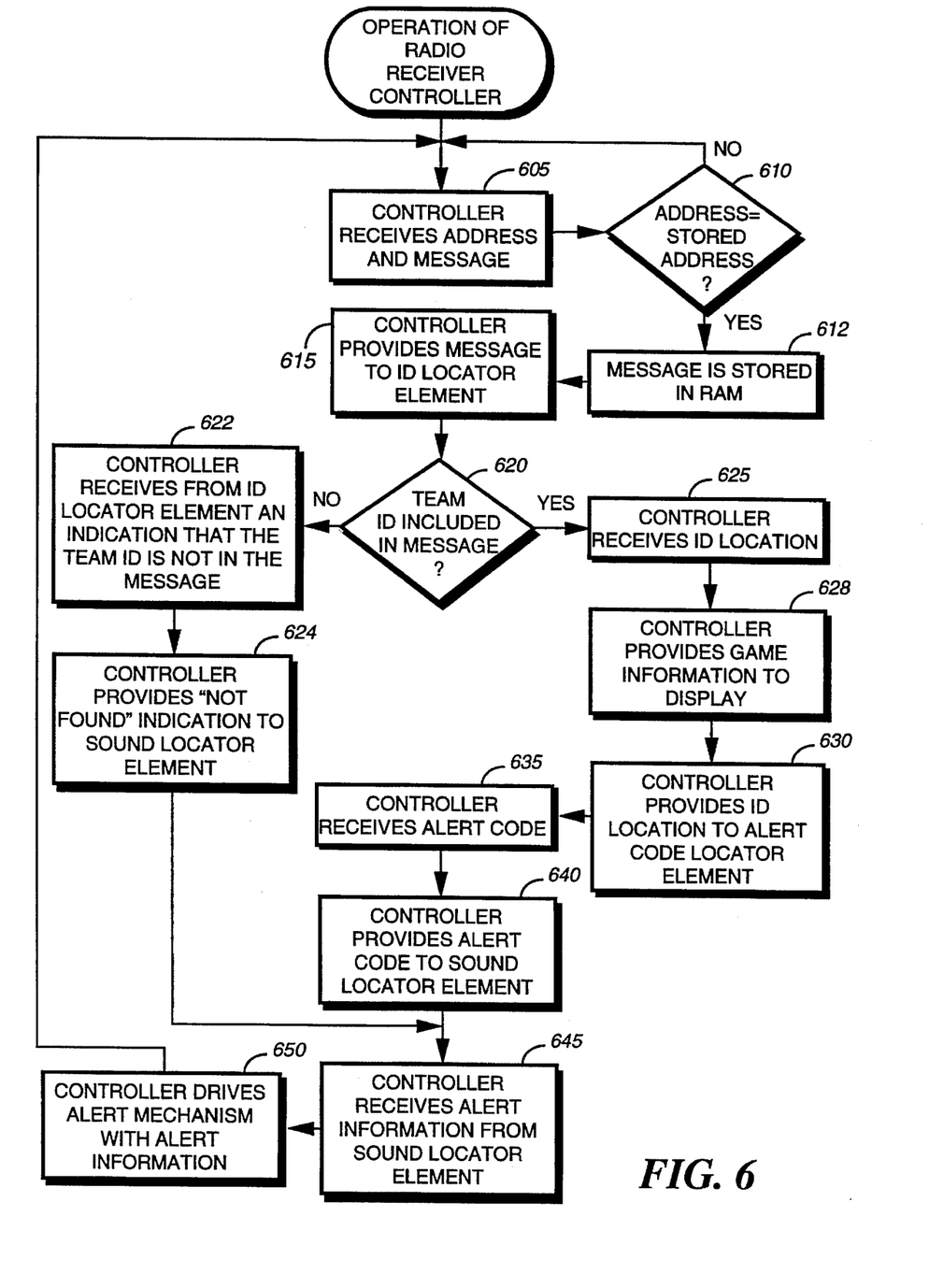
FIG. 6 is a flowchart of the operation of a controller included within the radio receiver of FIG. 5 in accordance with the present invention.

FIG. 6 is a flowchart depicting the operation of the radio receiver controller 515 (FIG. 5) in accordance with the present invention. At step 605, the controller 515 receives the address and message from the receiving circuit 510. When, at step 610, the received address is equivalent to the address stored in the ROM 545, the message is stored, at step 612, in the RAM 520. Thereafter, the controller 515 provides, at step 615, the message to the ID locator element 550. When, at step 620, the team ID is not included in the message, the controller 515, at step 622, receives a "not found" indication from the ID locator element 550. This "not found" indication is provided, at step 624, to the sound locator element 560 (FIG. 5).

Conversely, when, at step 620, the team ID associated with the receiver 110 is included within the message, the location of the ID is provided by the ID locator element 550 to the controller 515, at step 625. Thereafter, the controller 515, at step 628, provides the message to the display 540 to automatically present the message to the user. Next, at step 630, the ID location is provided to the alert code locator element 555, which determines which of the alert codes included in the message is the alert code to be used by the receiver 110. When, at step 635, the controller 515 receives the alert code from the alert code locator element 555, the alert code is provided, at step 640, to the sound locator element 560 for looking up alert information associated with the alert code. Alternatively, when the team ID was not included in the message, the "not found" indication is provided, at step 624, to the sound locator element 560, as described above. The sound locator element 560 uses the indication from the controller 515 or the alert code to look up alert information, which is provided, at step 645, to the controller 515. At step 650, the controller 515 drives the alert mechanism 535 with the alert information to produce an alert audible to the user. This alert is preferably a default alert when the team ID is not included in the message such that the user recognizes that the received message does not include information about the team associated with the receiver 110. So that the user is not distracted by alerts announcing message that are not associated with his team, the default alert can be a visible alert, rather than an audible alert, or the message can be stored without any announcement at all.

Figure 7:
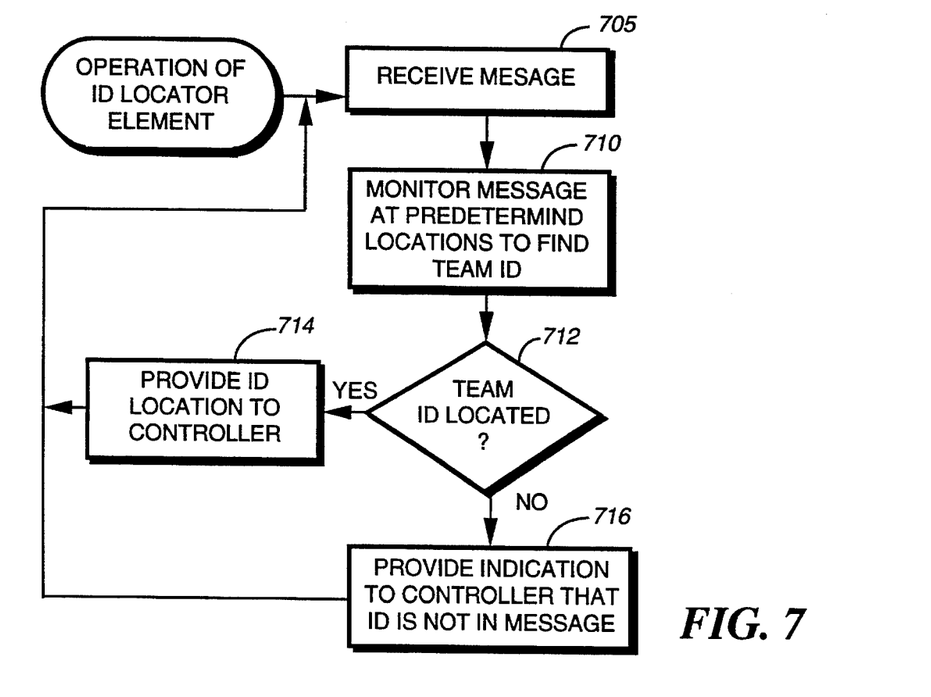
FIG. 7 is a flowchart illustrating the operation of an identification locator element included within the radio receiver of FIG. 5 in accordance with the present invention.

FIG. 7 is a flowchart of the operation of the ID locator element 550 (FIG. 5) in accordance with the present invention. At step 705, the ID locator element 550 receives the message from the controller 515. Thereafter, the message is monitored, at step 710, to determine whether the team ID associated with the receiver 110 is included in either of the predetermined locations for the home or visitor team within the message. When the team ID is found, at step 712, the location of the team ID is provided, at step 714, to the controller 515. This location can be, for example, indicated by the numbers of the message bits, e.g., bits nine through sixteen, in which the team ID is included. When the team ID is not found, an indication thereof is provided to the controller 515, at step 716.

Figure 8:
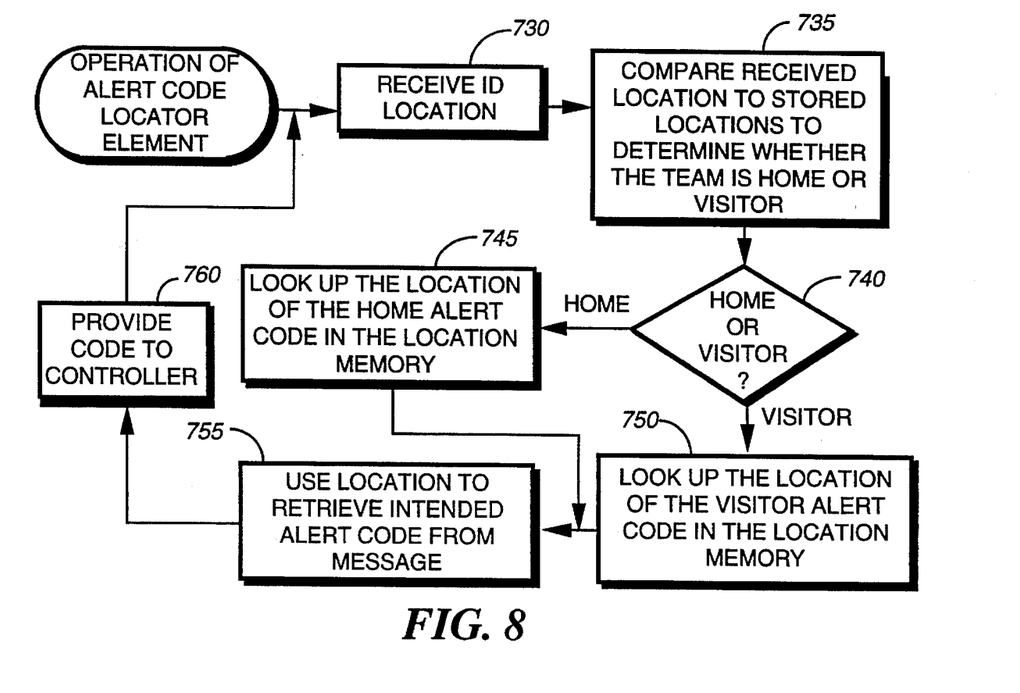
FIG. 8 is a flowchart depicting the operation of an alert code locator element included within the radio receiver of FIG. 5 in accordance with the present invention.

FIG. 8 is a flowchart of the operation of the alert code locator element 555 (FIG. 5). According to the present invention, the alert code locator element 555 receives, at step 730, the ID location from the controller 515. The alert code locator element 555 compares, at step 735, the received location to team ID locations stored in the location memory 525 to determine whether the team ID location is indicative of the home team or the visitor team. By way of example, the location memory 525 can indicate that bits nine through sixteen store the ID for the home team. In that situation, the alert code locator element 555 can determine that the team associated with the receiver 110 is currently the home team when the ID located at bits nine through sixteen of the message is equivalent to the receiver team ID. It will be understood that the ID location of bits nine through sixteen is for example purposes only, and that other locations within the message can be alternatively used.

When, at step 740, the receiver 110 is associated with the home team, the location for the home team alert code is looked up, at step 745, in the location memory 525. For example, the home team alert code location could be specified as bits twenty-one through twenty-four of the message. When the receiver 110 is associated with the visitor team, the location for the visitor team alert code is determined, at step 750. Thereafter, the location indicated in the location memory 525 is utilized, at step 755, to retrieve from the message the alert code having that location in the message. When, for instance, the receiver 110 is currently associated with the home team and the home team alert code location is specified as bits twenty-one through twenty-four, the alert code locator element 555 retrieves the information included in those bits of the message to retrieve the appropriate alert code. The alert code selected from the message is provided, at step 760, to the controller 515.

Figure 9:
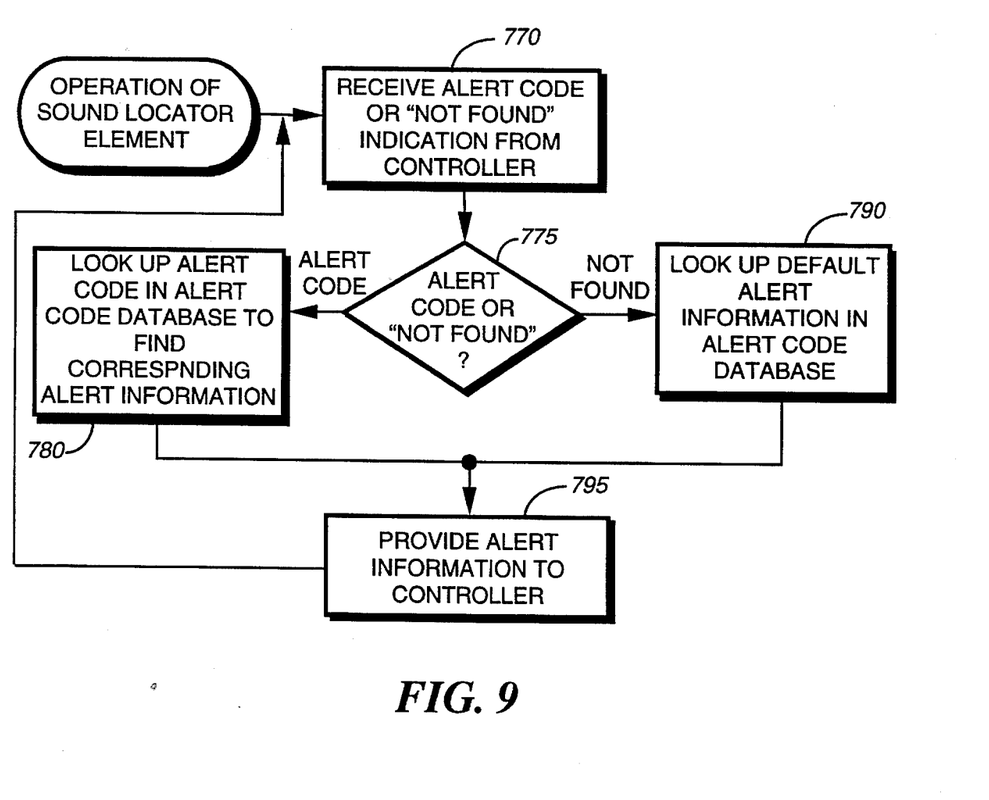
FIG. 9 is a flowchart of the operation of a sound locator element included within the radio receiver of FIG. 5 in accordance with the present invention.

Referring next to FIG. 9, the operation of the sound locator element 560 (FIG. 5) is depicted. At step 770, the sound locator element 560 receives the alert code or the "not found" indication from the controller 515. When, at step 775, the information provided by the controller 515 includes an alert code, the sound locator element 560, at step 780, looks up the alert code in the alert database 530 to find the corresponding alert information. When the controller 515 provides a "not found" indication to the sound locator element 560, the default alert information is looked up in the alert database 530, at step 790. As described above, the alert information can be, for example, an alert pattern for driving a transducer or a recorded sound. Next, at step 795, the sound locator element 560 provides the alert information to the controller 515.

Although game information included in a message associated with the receiver team is described as being presented to the user, alternate embodiments of the present invention are envisioned in which the message is announced by an alert but then only stored until display is requested by the user. Similarly, messages that do not include information about the receiver team could be processed differently. For instance, the message could simply be discarded once it is determined that the receiver team is not the home or visitor team. In such a situation, it will be appreciated that reception of the message would probably not be announced using a default alert or any other type of alert.

In summary, the communication system as described above includes a terminal for providing messages related to sports events to a plurality of radio receivers having the same paging address. Each message transmitted by the terminal includes a home team identification code located in a first predetermined location of the message and a visitor team identification code located in a second predetermined location of the message. The home team and visitor team identification codes are indicative of home and visitor teams currently playing a game, such as a baseball game, which is the subject of the message.

The radio receivers receive the message and can conveniently determine whether a team associated with each receiver is playing the game that is the subject of the message. When the receiver team is either the home or visitor team, unique alert codes are retrieved from the message and used to generate event-specific alerts informing the user of a favorable or unfavorable performance by his team. When, on the other hand, the receiver team is not the subject of the message, reception of the message is preferably announced by a different default alert. Therefore, the user can advantageously identify whether the message is of interest before reading the message. As a result, the user is not forced to read each and every message to be presented with messages about games in which he is interested.

It will be appreciated by now that there has been provided a method and apparatus for identifying to the user messages relating to a particular topic or event in which he is interested.

What is claimed is:

1. A method, in a radio receiver, for identifying messages concerning particular sports teams, the method comprising the steps of:

receiving and decoding a radio frequency signal to recover therefrom a message about a sports event;

determining whether an identification code associated with the radio receiver is included within a first location of the message or a second location of the message;

determining that a sports team associated with the radio receiver is a home team in the sports event when the identification code is included within the first location; and determining that the sports team associated with the radio receiver is a visitor team when the identification code is included within the second location.

2. The method of claim 1, further comprising the step of storing the message in a memory.

3. The method of claim 2, further comprising the step of discarding the message from the memory when the identification code is not included in the first or second locations.

4. The method of claim 2, further comprising the step of generating a default alert in response to determining that the identification code is not included in the first or second locations.

5. The method of claim 2, further comprising the steps of:

generating a first alert in response to determining that the sports team is the home team; and generating a second alert in response to determining that the sports team is the visitor team.

6. The method of claim 5, further comprising the step of:

automatically displaying the message in response to determining that the sports team is the home team or the visitor team.

7. A communication system for identifying messages concerning particular sports teams, the communication system comprising:

a terminal for transmitting a message about a sports event as a radio frequency signal; and a radio receiver for receiving and decoding the radio frequency signal to recover therefrom the message and for determining whether an identification code associated with the radio receiver is included within a first location of the message or a second location of the message, wherein a sports team associated with the radio receiver is a home team in the sports event when the identification code is included within the first location, and wherein the sports team associated with the radio receiver is a visitor team in the sports event when the identification code is included within the second location.

8. The communication system of claim 7, wherein the radio receiver comprises:

a memory for storing the first and second locations indicative of the home and visitor teams; and an identification locator element for determining, with reference to the memory, whether the identification code is located within the first or second location of the message.

9. The communication system of claim 8, wherein the radio receiver further comprises:

a random access memory for storing the message.

10. The communication system of claim 8, wherein the radio receiver further comprises:

a display for automatically presenting the message in response to a determination by the identification locator element that the identification code is located in one of the first or second locations.

11. The communication system of claim 8, wherein the radio receiver further comprises a controller for determining that the sports team associated with the radio receiver is the home team in response to the identification locator element determining that the identification code is located in the first location and for determining that the sports team is the visitor team in response to the identification locator element determining that the identification code is located in the second location.

12. The communication system of claim 11, wherein the radio receiver further comprises an alert mechanism for generating a first alert in response to the controller determining that the sports team is the home team and for generating a second alert in response to the controller determining that the sports team is the visitor team.

13. The communication system of claim 11, wherein the radio receiver further comprises an alert mechanism for generating a default alert in response to the identification locator element determining that the identification code is not located in the first or second location.

14. The communication system of claim 7, wherein the terminal comprises:

a data entry device for receiving information about the sports event;

a database for storing a plurality of identification codes, each associated with one of a plurality of sports teams; and transmitting means for transmitting the information about the sports event and at least two of the plurality of identification codes as the message, wherein the at least two of the plurality of identification codes are indicative of at least two sports teams playing in the sports event.

15. A radio receiver for receiving messages about sports events, the radio receiver comprising:

a receiving circuit for receiving a radio frequency signal and recovering therefrom a message about a sports event;

an identification locator element for determining whether an identification code is included within a first location of the message or a second location of the message; and a controller coupled to the identification locator element for determining that a sports team associated with the radio receiver is a home team in the sports event when the identification code is included in the first location and for determining that the sports team is a visitor team in the sports event when the identification code is included in the second location.

16. The radio receiver of claim 15, further comprising:
   a read only memory coupled to the controller for storing the identification locator element.

17. The radio receiver of claim 15, further comprising a memory for storing the first and second locations of the home and visitor teams.

18. The radio receiver of claim 15, further comprising:
   a display for automatically displaying the message in response to a determination by the identification locator element that the identification code is included in one of the first or second locations.

19. The radio receiver of claim 15, further comprising an alert mechanism for generating a first alert in response to the controller determining that the sports team is the home team for generating a second alert in response to the controller determining that the sports team is the visitor team.

20. The radio receiver of claim 15, further comprising an alert mechanism for generating a default alert in response to the identification locator element determining that the identification code is not located in the first or second location.

* * * * *